(12) United States Patent
Kumazawa et al.

(10) Patent No.: US 10,349,378 B2
(45) Date of Patent: Jul. 9, 2019

(54) SENSOR NETWORK SYSTEM, SENSING MODULE, SERVER, AND ASSOCIATION METHOD

(71) Applicant: ALPS ALPINE CO., LTD., Tokyo (JP)

(72) Inventors: Mamoru Kumazawa, Miyagi (JP); Touichi Okuno, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 15/995,270

(22) Filed: Jun. 1, 2018

(65) Prior Publication Data

US 2018/0279255 A1    Sep. 27, 2018

Related U.S. Application Data

(63) Continuation of application No. PCT/JP2016/088758, filed on Dec. 26, 2016.

(30) Foreign Application Priority Data

Jan. 15, 2016    (JP) .................................. 2016-006271

(51) Int. Cl.
*H04W 64/00*    (2009.01)
*G01D 21/00*    (2006.01)
(Continued)

(52) U.S. Cl.
CPC .......... *H04W 64/006* (2013.01); *G01D 21/00* (2013.01); *H04L 67/12* (2013.01);
(Continued)

(58) Field of Classification Search
None
See application file for complete search history.

(56) References Cited

U.S. PATENT DOCUMENTS 9,713,119 B2    7/2017  Teranishi et al.
2005/0187667 A1*  8/2005  Vredevoogd ....... B60C 23/0416
                                                          701/1
(Continued)

FOREIGN PATENT DOCUMENTS

DE    102014211074    12/2015
JP    2003-331376    11/2003
(Continued)

OTHER PUBLICATIONS

International Search Report dated Jan. 31, 2017 in PCT/JP2016/088758 filed on Dec. 26, 2016.
(Continued)

*Primary Examiner* — Fayyaz Alam
(74) *Attorney, Agent, or Firm* — IPUSA, PLLC

(57) ABSTRACT

A generating module generates a signal including a set pattern that includes a specific pattern by varying a physical quantity. A sensing module including a sensor transmits to a server, pattern detection information generated in response to the sensor detecting the specific pattern and sensor identification information identifying the sensor that has detected the specific pattern. The server stores association information associating the sensor identification information received from the sensing module that has transmitted the pattern detection information with installation target information communicated from the generating module that has generated the specific pattern.

17 Claims, 9 Drawing Sheets

(51) Int. Cl.
*H04L 29/08* (2006.01)
*H04W 24/02* (2009.01)
*H04W 84/22* (2009.01)
*H04Q 9/00* (2006.01)

(52) U.S. Cl.
CPC .............. *H04Q 9/00* (2013.01); *H04W 24/02* (2013.01); *H04W 84/22* (2013.01); *G08C 2201/93* (2013.01); *H04Q 2209/70* (2013.01); *H04Q 2209/80* (2013.01)

(56) References Cited

U.S. PATENT DOCUMENTS

2010/0245057 A1    9/2010   Chamarti et al.
2015/0057878 A1*   2/2015   Friel .................. B60C 23/0416
                                                                      701/34.4
2018/0365960 A1*   12/2018   Kay ..................... G08B 29/183

FOREIGN PATENT DOCUMENTS

JP       2013-186552     9/2013
WO     2014/013578     1/2014

OTHER PUBLICATIONS

Extended European Search Report for 16885125.1 dated Nov. 28, 2018.

\* cited by examiner

SENSOR NETWORK SYSTEM, SENSING MODULE, SERVER, AND ASSOCIATION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/088758 filed on Dec. 26, 2016 and designating the U.S., which claims priority to Japanese Patent Application No. 2016-006271 filed on Jan. 15, 2016. The entire contents of the foregoing applications are incorporated herein by reference.

BACKGROUND OF THE INVENTION

1. Field of the Invention

The present invention relates to a sensor network system, a sensing module, a server, and an association method.

2. Description of the Related Art

Sensor network systems including a plurality of sensors installed at various positions to acquire data such as the temperature from each sensor are known. Such sensor network systems need to know the position at which data is acquired by each sensor. For example, International PCT Patent Application Publication WO 2014/013578 describes a sensor network system in which sensors are able to communicate with each other and data of each sensor is communicated to a parent apparatus through multi-hop transmission (relaying) by multiple sensors. The parent apparatus uses the number of hops to estimate the approximate position of a sensor.

However, according to the above-described technique, a sensor and the position of the sensor cannot be associated with each other unless the sensor is used for multi-hop data transmission. Further, because the number of hops is used, the position of a sensor can only be estimated, and as such, the sensor and the position of the sensor cannot be accurately associated with each other. Further, because the position of an antenna associated with a sensor is regarded as the position of the sensor, the position of the sensor cannot be accurately determined in a case where the antenna and the sensor are separated from each other. Also, a moving objet having a sensor attached thereto cannot be identified. In other words, a sensor cannot be accurately associated with a sensor position or a sensor installation target, such as a moving object to which the sensor is attached, for example.

SUMMARY OF THE INVENTION

One aspect of the present invention is directed to providing a technique for accurately associating a sensor with the installation target of the sensor.

According to one embodiment of the present invention, a sensor network system is provided that includes a server, one or more sensing modules including one or more sensors configured to detect a physical quantity, and at least one generating module. The generating module includes a signal generator configured to generate a signal by varying the physical quantity to be detected by a sensor of the one or more sensors included in a sensing module of the one or more sensing modules. The generating module is further configured to communicate installation target information identifying an installation target of the sensor to the server. The generating module further includes a signal control unit configured to control the signal generator to generate the signal that includes a set pattern including a specific pattern. The sensing module further includes a sensing-side communication device configured to communicate with the server, and a pattern detection information transmitting unit configured to transmit to the server, via the sensing-side communication device, pattern detection information generated in response to the sensor detecting the specific pattern and sensor identification information identifying the sensor that has detected the specific pattern. The server further includes a server-side communication device configured to communicate with the sensing-side communication device, and a storage control unit configured to store association information associating the sensor identification information received by the server-side communication device from the sensing module that has transmitted the pattern detection information with the installation target information transmitted from the generating module that has generated the specific pattern.

DESCRIPTION OF THE EMBODIMENTS

In the following, embodiments of the present invention are described with reference to the accompanying drawings.

(First Embodiment)

Figure 1:
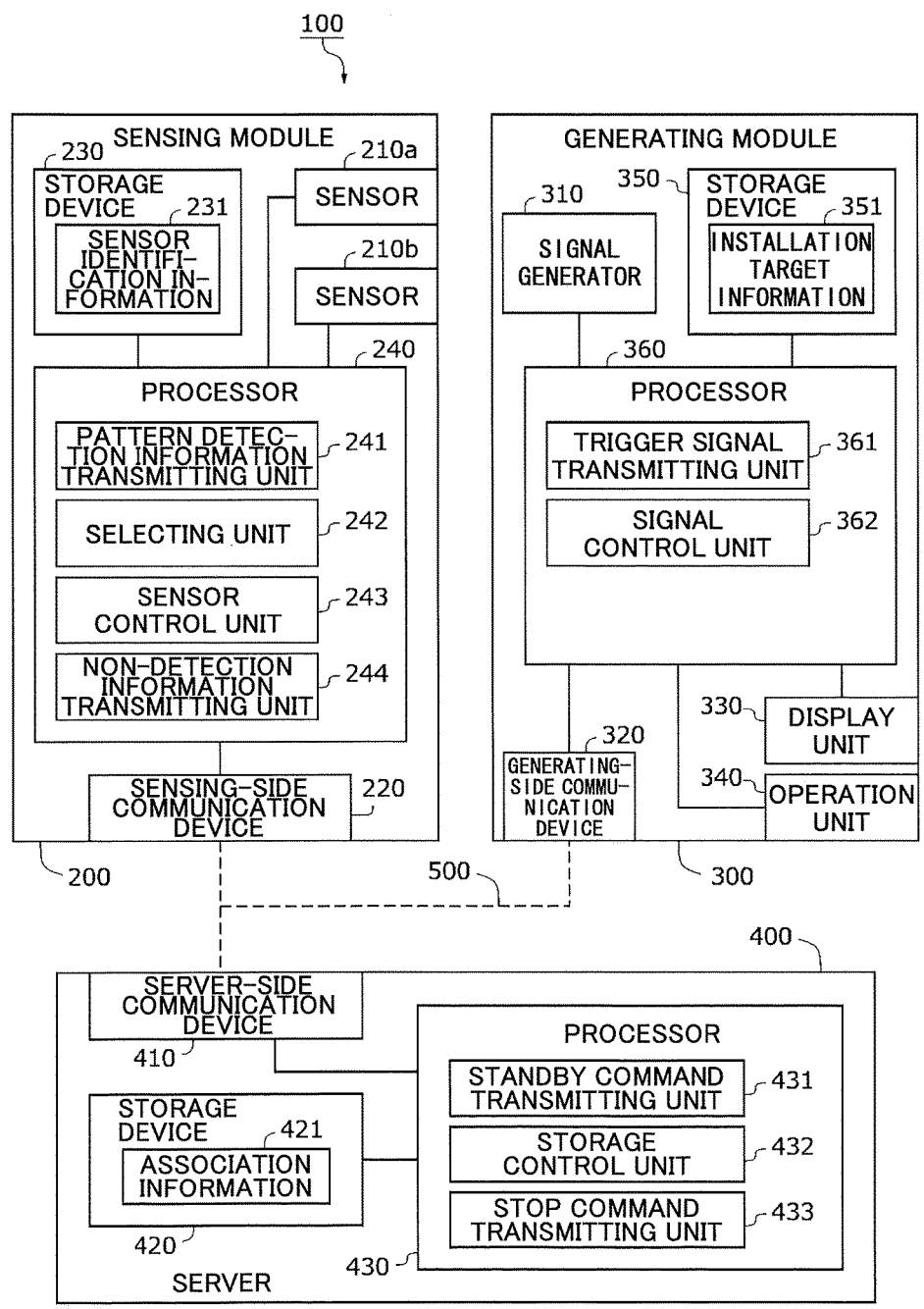
FIG. 1 is a configuration diagram of a sensor network system according to a first embodiment of the present invention.

In the following, a sensor network system according to a first embodiment of the present invention will be described. FIG. 1 is a block diagram showing an example configuration of a sensor network system 100 according to the present embodiment. The sensor network system 100 includes one or more sensing modules 200, one or more generating modules 300, and a server 400.

The server 400 manages association information 421. The association information 421 is information associating a sensor 210 included in the sensing module 200 with a corresponding installation target of the sensor 210. The server 400 manages detections obtained by the sensor 210 based on the association information 421. Note that the present description mainly illustrates embodiments of a system, an apparatus, and a method relating to storing association information associating sensors 210 with their respective installation targets in the server 400.

The installation target of the sensor 210 may be a position represented by latitude and longitude, or some other item, such as a room in which the sensor 210 is installed, a position within a room in which the sensor 210 is installed, a factory assembly line in which the sensor 210 is installed, a part of a robot in which the sensor 210 is installed, a moving body in which the sensor 210 is installed, a person that is carrying the sensor 210, or a detection target of the sensor 210 (especially when the sensor 210 and the detection target are separated from each other), for example. Note, however, that the installation target is not limited to the above examples. The installation target is identified by installation target information 351, which is described below. For example, by defining different installation target information 351 for each room, the server 400 may be able to recognize the specific room in which the sensor 210 is to detect a physical quantity. Note that the association between the installation target information 351 and the installation target may be pre-set in the server 400, set up as desired by an operator, or set up in some other manner, for example.

In the following, an example configuration of the sensor network system 100 will be briefly described. In the present embodiment, a single sensing module 200 includes a plurality of sensors 210. An operator sequentially places one sensing module 200 in each of a plurality of rooms. As described below, each sensing module 200 has a first sensor 210a that detects the brightness of a room and a second sensor 210b that detects the temperature of a room. The operator carries one generating module 300. When the operator installs a sensing module 200 in each room, the operator transmits light from the generating module 300 to the sensor 210a of the sensing module 200 to register the association information 421 in the server 400. Note that in some embodiments, a plurality of operators may each carry one generating module 300, for example.

(Sensing Module)

As shown in FIG. 1, the sensing module 200 includes the first sensor 210a, the second sensor 210b, a sensing-side communication device 220, a storage device 230, and a processor 240. Note that in the present description, the first sensor 201a and the second sensor 210b may generically be referred to as "sensor 210". Further, a plurality of sensors 210 of a plurality of sensing modules 200 included in the sensor network system 100 may generically be referred to as "sensors 210". Also, the above components of the sensing module 200 may be physically separable from each other, for example.

The first sensor 210a detects light as a physical quantity. The second sensor 210b detects the temperature as a physical quantity. Note that in some embodiments, the sensing module 200 may include three or more sensors 210. For example, the sensing module 200 may include a plurality of sensors 210 that detect the same physical quantity, or the sensing module 200 may include a plurality of sensors 210 that detect different physical quantities. The physical quantity to be detected by the sensor 210 is not limited to the examples described in the present embodiment. Examples of physical quantities to be detected include, but are not limited to, temperature, humidity, moisture, heat, density, viscosity, flow rate, pressure, acceleration, vibration, strain, light, magnetism, displacement, position, and rotation.

The sensing-side communication device 220 communicates with a server-side communication device 410 of the server 400 (described below) via a communication network 500. The communication network 500 may be a wireless network, a wired network, or a combination thereof, for example.

The storage device 230 stores a sensing module program to be executed by the sensing module 200. The sensing module program, when read and executed by the processor 240, causes the processor 240 to implement various functions including a function of performing a part of an association method according to the present embodiment. When the processor 240 implements various functions, the storage device 230 is controlled by the processor 240 to store necessary information. The storage device 230 is a non-transitory tangible storage medium. The storage device 230 includes a ROM (read only memory) and a RAM (random access memory). The storage device 230 may be a volatile storage medium or a non-volatile storage medium. Also, the storage device 230 may be a removable storage medium or a non-removable storage medium.

The storage device 230 further stores sensor identification information 231. The sensor identification information 231 is information identifying each of a plurality of sensors 210 included in the sensor network system 100.

The processor 240 reads and executes the sensing module program stored in the storage device 230 to implement functions of a pattern detection information transmitting unit 241, a selecting unit 242, a sensor control unit 243, and a non-detection information transmitting unit 244. Note that although a general purpose computer is used as the processor 240 in the present embodiment, the processor 240 may also be an application specific integrated circuit (ASIC) or some other circuit that is capable of implementing the functions described in the present embodiment.

The pattern detection information transmitting unit 241 generates pattern detection information in response to the sensor 210 detecting a specific pattern as described below. The specific pattern is a signal indicating the start of operations for registering association information 421. The pattern detection information is a signal indicating that a specific pattern has been detected. The pattern detection information transmitting unit 241 generates the pattern detection information in response to detecting the specific pattern and includes installation target information 351 in the pattern detection information. As described below, the generating module 300 generates a signal including a set pattern that includes the installation target information 351 and the specific pattern. The generating module 300 transmits the specific pattern included in the set pattern, followed by the installation target information 351.

The pattern detection information transmitting unit 241 transmits to the server 400, via the sensing-side communication device 220, the pattern detection information including the installation target information 351 and the sensor identification information 231 identifying the sensor 210 that has detected the specific pattern. For example, when a specific pattern that is communicated by light is detected by the first sensor 210a of a sensing module 200, sensor identification information 231 identifying the sensors 210 included in the sensing module 200 from among a plurality of sensing modules 200 is transmitted to the server 400. Note that the same sensor identification information 231 may be assigned to the plurality of sensors 210 included in one sensing module 200, or different sensor identification information 231 may be assigned to each of the plurality of sensors 210. Also, each of the plurality of sensors 210 included in one sensing module 200 may be associated with the same installation target or a different installation target.

In the present embodiment, the same sensor identification information 231 is assigned to the plurality of sensors 210 included in one sensing module 200. As such, the plurality of sensors 210 included in one sensing module 200 are all associated with the same installation target.

Note that in another embodiment, the pattern detection information transmitting unit 241 may transmit all detections obtained by the sensor 210 to the server 400 without determining whether a specific pattern has been detected. In such other embodiment, detection of a specific pattern among the detections corresponds to the pattern detection information. In such other embodiment, the server 400 extracts from all the detections of the sensor 210, the detection corresponding to the pattern detection information generated in response to the sensor 210 detecting the specific pattern.

The selecting unit 242 selects at least one of a plurality of operation modes. The plurality of operation modes include a standby mode and a non-standby mode. The sensor network system 100 is configured such that when the standby mode is selected by the selecting unit 242, a storage control unit 432 of the server 400 stores association information 421 as described below. Further, the sensor network system 100 is configured such that when the non-standby mode is selected by the selecting unit 242, the storage control unit 432 of the server 400 does not store association information 421 as described below. Examples of the non-standby mode may include an operation mode to stop detection and an operation mode for normal detection. In the present embodiment, the non-standby mode collectively refers to states in which the standby mode is not selected.

The selecting unit 242 selects the standby mode when the sensing-side communication device 220 receives a standby command from the server 400. Then, when a predetermined waiting period elapses from the time the selecting unit 242 selects the standby mode, the selecting unit 242 selects the non-standby mode.

The sensor control unit 243 enables detection of a set pattern by the sensor 210 in response to the selecting unit 242 selecting the standby mode. The sensor control unit 243 disables detection of a set pattern by the sensor 210 in response to the selecting unit 242 selecting the non-standby mode. For example, it is assumed below that in the non-standby mode, the first sensor 210a detects the intensity of light once per hour, and the set pattern corresponds to a light intensity variation per second. In this case, in the standby mode, the sensor control unit 243 controls the first sensor 210a to be capable of detecting the light intensity variation per second, and in the non-standby mode, the sensor control unit 243 controls the first sensor 210a to detect the intensity of light once per hour. In this way, for example, even if energy consumption of the first sensor 210a may be relatively high in the standby mode, when a set pattern does not have to be detected, the non-standby mode with lower energy consumption may be selected to reduce energy consumption.

After the standby mode is selected, if a specific pattern is not detected by the sensor 210 within a predetermined waiting period, the non-detection information transmitting unit 244 transmits to the server 400, via the sensing-side communication device 220, sensor identification information 231 identifying the sensor 210 that did not detect a specific pattern and non-detection information indicating that the specific pattern has not been detected. Based on the non-detection information, the server 400 may be explicitly notified that the sensor 210 has not detected a specific pattern.

(Generating Module)

The generating module 300 includes a signal generator 310, a generating-side communication device 320, a display unit 330, an operation unit 340, a storage device 350, and a processor 360. The generating module 300 according to the present embodiment is a smart phone. Note that the above components of the generating module 300 may be physically separated from each other, for example.

The signal generator 310 generates a signal by varying a physical quantity to be detected by at least one sensor 210 of at least one sensing module 200. The signal generator 310 in the present embodiment is a light source that generates light to be detected by the first sensor 210a. The light source may be a built-in flashlight, an external light emitting diode, or a built-in display, for example. In the case where the signal generator 310 is configured to generate a signal using a physical quantity other than light, the signal generator 310 may be a heater, a cooler, a humidifier, a dehumidifier, a pressure pump, a vibration generator, or an electromagnets, for example.

The generating-side communication device 320 communicates with the server-side communication device 410 of the server 400 (described below) via the communication network 500. The communication network 500 may be a wireless network, a wired network, or a combination thereof.

The display unit 330 presents text, images, video, and the like to the operator. The display unit 330 may be a liquid crystal display, for example. The operation unit 340 receives an input from the operator. For example, the operation unit 340 may be an electrostatic capacitive input device, a mechanical button, or a mechanical slider. In the present embodiment, the display unit 330 and the operation unit 340 are integrated to constitute a capacitive touch panel display.

Figure 2:
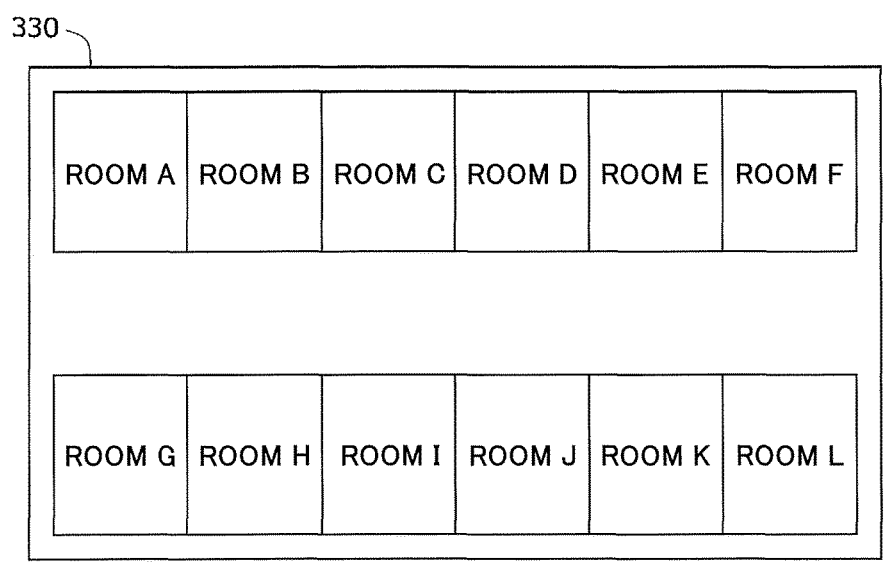
FIG. 2 is a diagram showing an example screen displayed on a display unit of the sensor network system.

FIG. 2 shows an example screen display of the display unit 330. A layout drawing of actual rooms A to L is displayed on the display unit 330. When the operator touches one of the rooms A to L displayed on the display unit 330, the operation unit 340 detects the room that has been touched by the operator.

The storage device 350 shown in FIG. 1 stores the installation target information 351 and a generating module program to be executed by the generating module 300. The generating module program, when read and executed by the processor 360, causes the processor 360 to implement various functions including a function of performing a part of an association method according to the present embodiment. When the processor 360 executes various functions, the storage device 350 is controlled by the processor 360 to store necessary information. The storage device 350 is a non-transitory tangible storage medium. The storage device 350 includes a ROM and a RAM. The storage device 350 may be a volatile storage medium or a non-volatile storage medium. Also, the storage device 350 may be a removable storage medium or a non-removable storage medium.

The processor 360 reads and executes the generating module program stored in the storage device 350 to implement functions of a trigger signal transmitting unit 361 and a signal control unit 362. Note that although the processor 360 in the present embodiment is a general-purpose computer, the processor 360 may also be an application specific integrated circuit (ASIC) or some other circuit that is capable of implementing the function of the embodiments described below.

The trigger signal transmitting unit 361 transmits a trigger signal to the server 400 via the generating-side communication device 320. The trigger signal indicates the start of operations for generating a signal including a set pattern as described below. In the present embodiment, when the operation unit 340 detects the pressing of a button displayed on the display unit 330, the trigger signal transmitting unit 361 transmits a trigger signal. Note that a trigger signal may be transmitted at some other timing, such as when the power of the generating module 300 is turned on, for example.

The signal control unit 362 controls the signal generator 310 to generate a signal including a set pattern by varying a physical quantity. The set pattern includes a specific pattern and installation target information 351. In the present embodiment where the signal generator 310 is a light source, the set pattern corresponds to a light intensity variation. The set pattern may be an analog signal or a digital signal. The signal control unit 362 controls the display unit 330 to display the screen of FIG. 2 and receives notification of the room that has been touched by the operator from the operation unit 340. The signal control unit 362 generates a communication frame including a specific pattern, followed by installation target information 351 corresponding to the room that has been touched. That is, the generating module 300 transmits the installation target information 351 identifying the installation target of the sensor 210 after the specific pattern. Note that the method of selecting the installation target information 351 is not limited to the above-described example.

The signal control unit 362 controls the signal generator 310 to generate a signal including a set pattern during a period including a time after the trigger signal has been transmitted by the trigger signal transmitting unit 361. For example, the signal control unit 362 may start generation of a signal including a set pattern immediately after a trigger signal is transmitted. The signal control unit 362 controls the signal generator 310 to stop generating the signal including the set pattern after receiving a stop command from the server 400 via the generating-side communication device 320.

Note that although the generating module 300 in the present embodiment corresponds to a smart phone, the generating module 300 may also be some other device. Also, one generating module 300 may be configured to enable selection of installation target information 351 of an installation target from among installation target information 351 of a plurality of installation targets as in the present embodiment, or alternatively, one generating module 300 may be configured to store installation target information 351 of only one installation target, for example.

(Server)

The server 400 includes the server-side communication device 410, a storage device 420, and a processor 430.

The server-side communication device 410 communicates with the sensing-side communication device 220 of the sensing module 200 and the generating-side communication device 320 of the generating module 300 via the communication network 500. The communication network 500 may be a wireless network, a wired network, or a combination thereof.

The storage device 420 stores association information 421 and a server program to be executed by the server 400. The server program, when read and executed by the processor 430, causes the processor 430 to implement various functions including a function of performing a part of an association method according to the present embodiment. When the processor 430 executes various functions, the storage device 420 is controlled by the processor 430 to store necessary information.

The processor 430 reads and executes the server program stored in the storage device 420 to implement functions of a standby command transmitting unit 431, a storage control unit 432, and a stop command transmitting unit 433.

The standby command transmitting unit 431 transmits a standby command to at least one sensing module 200 via the server-side communication device 410 in response to receiving a trigger signal from the generating module 300 via the server-side communication device 410. In the present embodiment, it is assumed that the sensing module 200 corresponding to the transmission destination of the standby command is a sensing module 200 including a sensor 210 for which association information 421 has not yet been stored. The sensing module 200 corresponding to the transmission destination of the standby command may alternatively be all of the sensing modules 200 included in the sensor network system 100 or one or more sensing modules 200 selected based on some other criteria, for example.

The storage control unit 432 stores in the storage device 420, association information 421 associating the sensor identification information 231 received by the server-side communication device 410 from the sensing module 200 that has transmitted the pattern detection information with the installation target information 351 transmitted from the generating module 300 that has generated the specific pattern to be detected by the sensing module 200. The storage control unit 432 acquires the installation target information 351 from the pattern detection information. The association information 421 indicates an association between sensor identification information 231 and installation target information 351; i.e., an association between the ID of a sensor 210 and the installation target of the sensor 210. For example, the installation position of a sensor 210 with a given ID can be determined based on the association information 421.

When the storage control unit 432 receives from a sensing module 200, sensor identification information 231 and non-detection information indicating that a set pattern has not been detected, the storage control unit 432 stores the received sensor identification information 231 and non-detection information in the storage device 420.

The stop command transmitting unit 433 transmits a stop command via the server-side communication device 410 in response to receiving the pattern detection information. The transmission destination of the stop command is the generating module 300 that has transmitted the trigger signal.

(Association Method when Specific Pattern is Detected)

Figure 3:
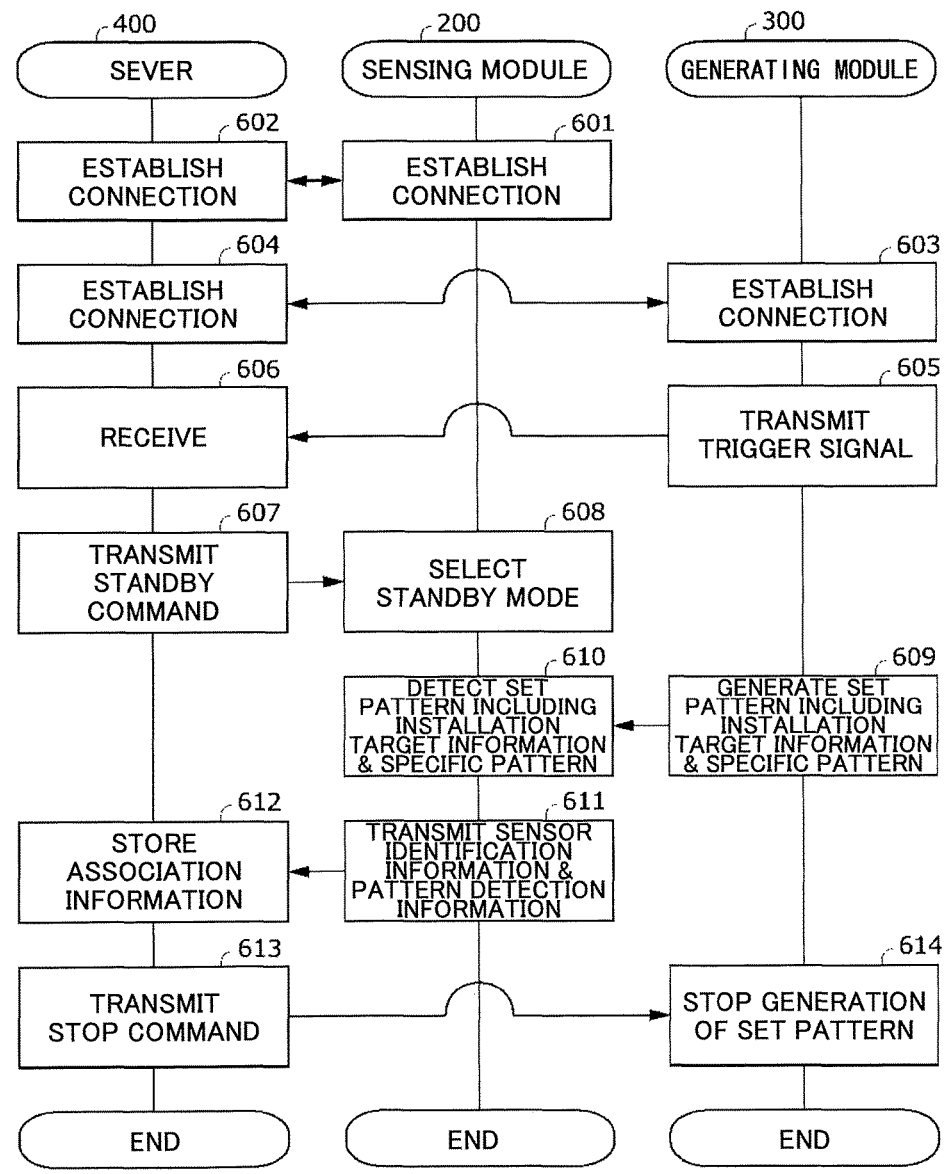
FIG. 3 is a flowchart showing operations of the sensor network system according to the first embodiment when a specific pattern is detected.

In the following, an association method for associating a sensor 210 with the installation target of the sensor 210 will be described with reference to FIG. 3. FIG. 3 is a flowchart showing operations to be implemented in a case where a specific pattern is detected by the sensing module 200 within a predetermined waiting period.

In steps 601 and 602, connection for communication is established between the sensing-side communication device 220 of the sensing module 200 and the server-side communication device 410 of the server 400. For example, steps 601 and 602 may be executed when the sensing module 200 is first connected to the communication network 500 and the power of the sensing module 200 is turned on.

In steps 603 and 604, connection for communication is established between the generating-side communication device 320 of the generating module 300 and the server-side communication device 410 of the server 400. For example, steps 603 and 604' may be executed when the generating module 300 is first connected to the communication network 500 and the power of the generating module 300 is turned on.

Note that connection between the sensing module 200 and the server 400 may be established before establishing connection between the generating module 300 and the server 400, or vice versa.

After connection is established between the generating module 300 and the server 400, in step 605, the trigger signal transmitting unit 361 of the generating module 300 transmits a trigger signal to the server 400 via the generating-side communication device 320 in response to an operation of the operation unit 340.

Then, in step 606, the standby command transmitting unit 431 of the server 400 receives the trigger signal from the generating module 300.

In step 607, the standby command transmitting unit 431 that has received the trigger signal transmits a standby command to a sensing module 200 for which association information 421 is not yet stored via the server-side communication device 410. Note that from among one or more sensing modules 200 that are connected to the communication network 500, there may be a sensing module 200 for which association information 421 is already stored and a sensing module 200 for which association information 421 is not yet stored in the server 400. The server 400 keeps track of whether association information 421 for each sensing module 200 is stored in the storage device 420. The standby command transmitting unit 431 searches the storage device 420 to determine the sensing module 200 for which association information 421 is not yet stored. Note that in some embodiments, the standby command transmitting unit 431 may transmit the standby command to all of the sensing modules 200.

After connection is established between the sensing module 200 and the server 400, in step 608, the selecting unit 242 of the sensing module 200 that has received the standby command selects the standby mode. In response to the selecting unit 242 selecting the standby mode, the sensor control unit 243 enables detection of a set pattern by the sensor 210. For example, assuming the first sensor 210a is configured to detect the intensity of light once per hour in the non-standby mode, and the set pattern corresponds to a light intensity variation per second, the sensor control unit 243 may control the first sensor 210a to be capable of detecting the light intensity variation per second in the standby mode.

After the trigger signal transmitting unit 361 of the generating module 300 transmits a trigger signal, in step 609, the signal control unit 362 controls the signal generator 310 to generate a signal including a set pattern by varying the physical quantity of light or the like. For example, the set pattern may be a light intensity variation per second. The signal control unit 362 generates a communication frame including the specific pattern, followed by installation target information 351. For example, installation target information 351 corresponding to the room selected by the operation unit 340 from among the rooms shown in the screen displayed on the display unit 330 in FIG. 2 may be included in the set pattern.

In step 610, the sensor 210 of the sensing module 200 detects the set pattern including the installation target information 351 and specific pattern. For example, the first sensor 210a may detect the set pattern represented by a light intensity variation per second. In the example process flow of FIG. 3, after the selecting unit 242 selects the standby mode, the specific pattern is detected by the sensor 210 before a predetermined waiting period elapses.

The pattern detection information transmitting unit 241 generates pattern detection information in response to the sensor 210 detecting the specific pattern. The pattern detection information transmitting unit 241 generates the pattern detection information by including the specific pattern, followed by the received installation target information 351.

In step 611, the pattern detection information transmitting unit 241 transmits the pattern detection information including the installation target information 351 and sensor identification information 231 identifying the sensor 210 that has detected the specific pattern to the server 400.

Then, in step 612, the server 400 receives the pattern detection information and the sensor identification information 231. The storage control unit 432 of the server 400 stores association information 421 associating the sensor identification information 231 received from the sensing module 200 that has transmitted the pattern detection information with the installation target information 351 transmitted from the generating module 300 that has generated the specific pattern. The storage control unit 432 acquires the installation target information 351 from the pattern detection information. Note that the generating module 300 that has generated the specific pattern corresponds to the generating module 300 that has transmitted the trigger signal.

In step 613, in response to receiving the pattern detection information, the stop command transmitting unit 433 of the server 400 transmits a stop command to the generating module 300 that has transmitted the trigger signal.

In step 614, the signal control unit 362 receives the stop command from the server 400 and controls the signal generator 310 to stop generating the signal including the set pattern. The sensing module 200 that has detected the specific pattern may automatically revert to the non-standby mode or revert to the non-standby mode in response to an instruction from the server 400.

(Association Method When Specific Pattern is not Detected)

Figure 4:
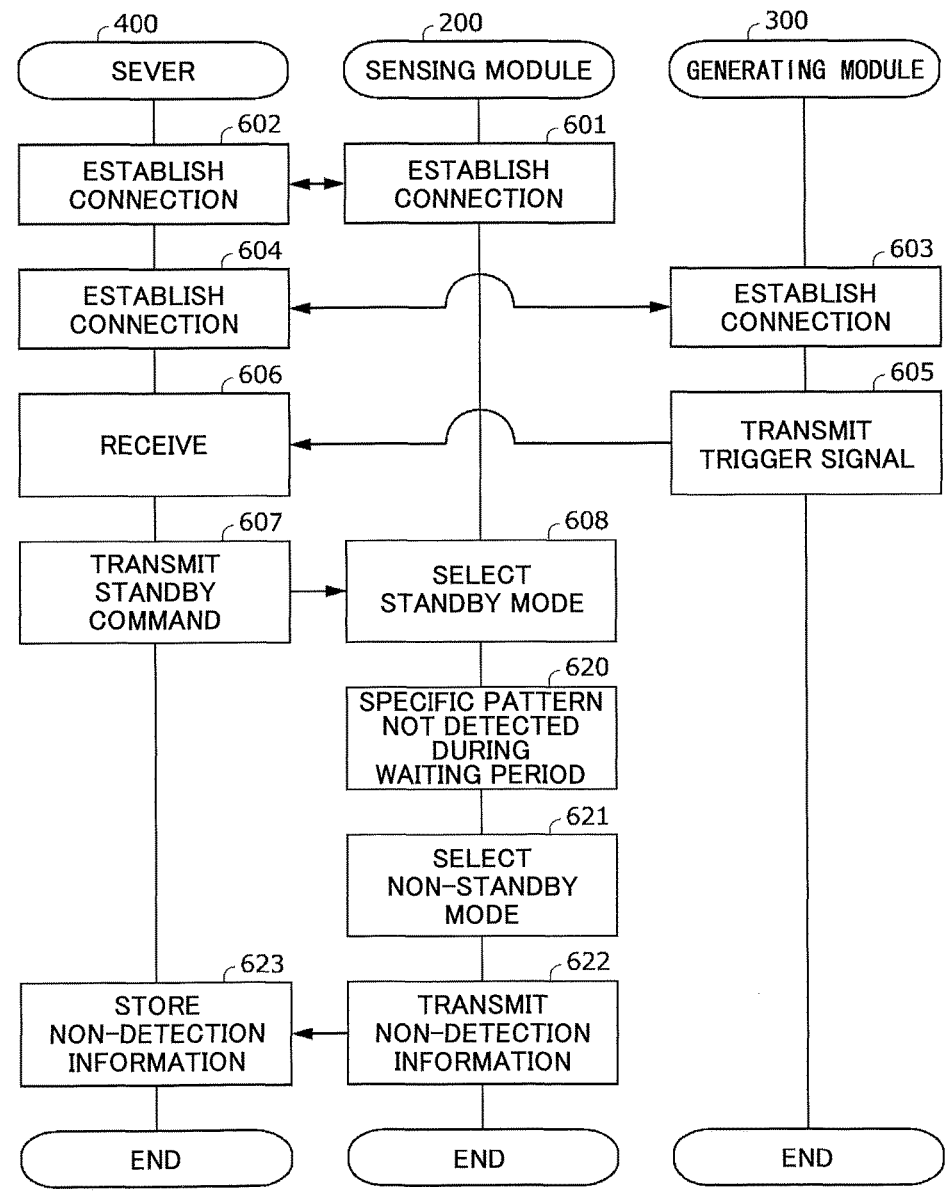
FIG. 4 is a flowchart showing operations of the sensor network system according to the first embodiment when a specific pattern is not detected.

In the following, an association method for associating a sensor 210 with the installation target of the sensor 210 in a case where a specific pattern is not detected by the sensing module 200 within a predetermined waiting period will be described with reference to FIG. 4. Note that steps 601 to 608 of FIG. 4 are identical to steps 601 to 608 of FIG. 3.

The generating module 300 associates each sensing module 200 with a corresponding installation target, and as such, when the generating module 300 is used to associate one sensing module 200 with an installation target, other sensing modules 200 will not detect the specific pattern included in the signal generated by the generating module 300. That is, the one sensing module 200 that is being associated with an installation target using the generating module 300 executes the operations of the sensing module 200 shown in FIG. 3, whereas the other sensing modules 200 execute the operations of the sensing module 200 shown in FIG. 4.

After selecting the standby mode, when the selecting unit 242 detects in step 620 that the predetermined waiting period has elapsed without the sensor 210 detecting a specific pattern, the process proceeds to step 621 in which the selecting unit 242 selects the non-standby mode.

Then, in step 622, when a specific pattern was not detected by the sensor 210 within the predetermined waiting period after the standby mode was selected, the non-detection information transmitting unit 244 transmits non-detection information indicating that a specific pattern was not detected to the server 400 via the sensing-side communication device 220.

When the storage control unit 432 receives from the sensing module 200, sensor identification information 231 and the non-detection information indicating that a specific pattern was not detected, the storage control unit 432 stores the received sensor identification information 231 and non-detection information in the storage device 420 in step 623.

According to an aspect of the present embodiment, sensor identification information 231 identifying a sensor 210 and installation target information 351 identifying the installation target of the sensor 210 are stored in association with each other in the server 400, and in this way, a sensor 210 and the installation target of the sensor 210 may be accurately associated with each other. Further, a sensor 210 and the installation target of the sensor 210 can be associated with each other using a physical quantity detection function of the sensor 210, and in this way, the configuration of the sensing module 200 can be simplified as compared with a case where a function for associating a sensor with its installation target has to be added. Also, a sensor 210 and the installation target of the sensor 210 can be associated with each other through relatively simple operations of generating and detecting a specific pattern, and in this way, human labor may be reduced and human operation errors due to erroneous association may be reduced as compared with a case where a human has to manually input the sensor identification information 231 and the installation target information 351.

According to an aspect of the present embodiment, the installation target information 351 is included in the set pattern, and a sensing module 200 that has detected the set pattern transmits both the installation target information 351 and the sensor identification information 231. In this way, a sensor may be accurately associated with its installation target using a relatively simple configuration as compared with a case where the installation target information 351 and the sensor identification information 231 are separately transmitted to the server 400.

According to an aspect of the present embodiment, a selection can be made between standby mode in which association information 421 is stored and non-standby mode in which association information 421 is not stored. In this way, when the standby mode is selected, the sensing module 200 can execute operations suitable for transmitting the sensor identification information 231 and the installation target information 351, whereas when the non-standby mode is selected, the sensing module 200 can execute operations suitable for implementing its primary detection function and other operations according to the situation without regard to whether the operations are suitable for transmitting the sensor identification information 231 and the installation target information 351.

According to an aspect of the present embodiment, when the standby mode is selected, the sensing module 200 can enable detection of the set pattern by the sensor 210. Thus, even if the sensor 210 is incapable of detecting the set pattern when the non-standby mode is selected, the sensor 210 will be capable of accurately detecting the set pattern at least when the standby mode is selected.

According to an aspect of the present embodiment, when the non-standby mode is selected, the sensing module 200 disables detection of a set pattern by the sensor 210 so that detection of a set pattern may be prevented when association information 421 does not have to be stored. That is, even if the sensor 210 is required to execute special operations when the standby mode is selected, the sensor 210 may be able to execute other operations without being affected by such special operations when the non-standby mode is selected.

According to an aspect of the present embodiment, when association information 421 has to be stored, a standby command may be issued so that the standby mode can be reliably selected.

According to an aspect of the present embodiment, the sensing module 200 selects the standby mode based on a trigger signal. In this way, the sensing module 200 can easily detect a set pattern included in a signal generated by the generating module 300 after transmitting the trigger signal.

According to an aspect of the present embodiment, the standby mode can be prevented from being selected for an unnecessarily long time in a sensing module 200 that does not receive the set pattern so that operations in the non-standby mode may not be unnecessarily hindered.

According to an aspect of the present embodiment, the server 400 is explicitly notified of the sensing module 200 that has not detected a specific pattern, and in this way, the server 400 may more accurately associate a sensor 210 with the installation target of the sensor 210. With such a configuration, the server 400 can be prevented from waiting for an unnecessarily long time to receive pattern detection information from the sensing module 200.

According to an aspect of the present embodiment, when the server 400 receives the pattern detection information from the sensing module, the server 400 transmits a stop command. In this way, the generating module 300 can be prevented from generating a set pattern during a period in which generation of the set pattern is unnecessary.

According to an aspect of the present embodiment, light is used to transmit the set pattern. In this way, even in an environment where a plurality of sensing modules 200 are provided, the set pattern that is represented by light may be selectively transmitted to a specific sensing module 200. In this way, a sensor 210 and the installation target of the sensor 210 can be accurately associated with each other.

(Modifications)

In the above-described embodiment, switching between storing association information 421 and not storing association information 421 is achieved by switching between enabling and disabling detection of a set pattern by the sensor 210. However, the sensor network system 100 may switch between storing association information 421 and not storing association information 421 using some other method.

For example, in a first example modification, when the standby mode is selected by the selecting unit 242, the pattern detection information transmitting unit 241 transmits both sensor identification information 231 and pattern detection information to the server 400 via the sensing-side communication device 220 in order to have association information 421 stored in the server 400. Also, in the first example modification, when the non-standby mode is selected by the selecting unit 242, the pattern detection information transmitting unit 241 refrains from transmitting at least one of the sensor identification information 231 and the pattern detection information to the server 400 via the sensing-side communication device 220 in order to prevent association information 421 from being stored in the server 400.

According to an aspect of the above modification, in the standby mode that involves storing association information 421, pattern detection information can be reliably transmitted from the sensing module 200 to the server 400, and in the non-standby mode that does not require storing association information 421, unnecessary communication between the sensing module 200 and the server 400 may be avoided.

For example, in a second example modification, the storage control unit 432 stores association information 421 in response to receiving pattern detection information from a sensing module 200 that has selected the standby mode. Also, in the second example modification, the storage control unit 432 does not store association information 421 in response to receiving pattern detection information from a sensing module 200 that has selected the non-standby mode. In the second example modification, whether a sensing module 200 has selected the standby mode or the non-standby mode may be communicated to the storage control unit 432 via the communication network 500, for example.

According to an aspect of the above modification, the storage control unit 432 of the server 400 determines whether to store association information 421. Accordingly, the sensing module 200 may execute the same operations in the standby mode and the non-standby mode, and in this way, the configuration of the sensing module 200 may be simplified.

(Second Embodiment)

Figure 5:
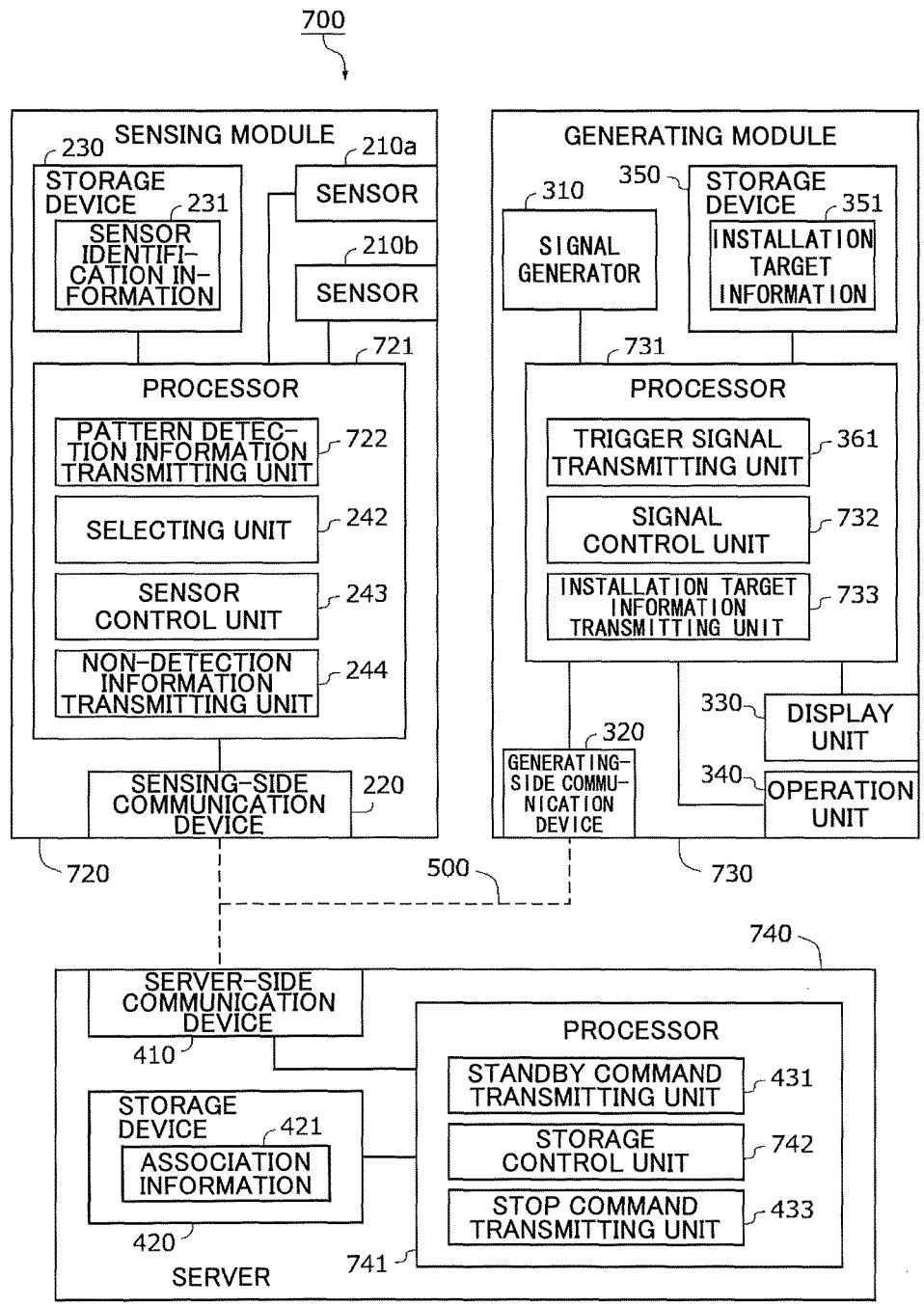
FIG. 5 is a configuration diagram of a sensor network system according to a second embodiment of the present invention.

In the following, a sensor network system according to a second embodiment of the present invention will be described. FIG. 5 is a block diagram of a sensor network system 700 according to the second embodiment. The sensor network system 700 includes one or more sensing modules 720, one or more generating modules 730, and a server 740. Note that the following description of the sensor network system 700 according to the second embodiment focuses on features that differ from those of the sensor network system 100 according to the first embodiment (FIG. 1).

The generating module 730 according to the present embodiment includes a processor 731 that implements functions differing from those of the processor 360 of the generating module 300 according to the first embodiment (FIG. 1). Specifically, a signal control unit 732 that is implemented by the processor 731 according to the present embodiment differs from the signal control unit 362 according to the first embodiment (FIG. 1) in that it controls the signal generator 310 to generate a signal by varying a physical quantity to have a specific pattern without including the installation target information 351 in the signal.

Further, the processor 731 according to the present embodiment additionally implements an installation target information transmitting unit 733 based on a generating module program. The installation target information transmitting unit 733 transmits installation target information 351 to the server 400 via the generating-side communication device 320.

The sensing module 720 according to the present embodiment includes a processor 721 that implements functions that differ from those of the sensing module 200 according to the first embodiment (FIG. 1). Specifically, a pattern detection information transmitting unit 722 that is implemented by the processor 721 according to the present embodiment differs from the pattern detection information transmitting unit 241 according to the first embodiment (FIG. 1) in that it generates pattern detection information that does not include installation target information 351 in response to the sensor 210 detecting a specific pattern.

The server 740 according to the present embodiment includes a processor 741 that implements functions that differ from those of the server 400 according to the first embodiment (FIG. 1). Specifically, a storage control unit 742 of the processor 741 according to the present embodiment differs from the storage control unit 432 according to the first embodiment (FIG. 1) in that it receives installation target information 351 from the installation target information transmitting unit 733 of the generating module 730 via the server-side communication device 410.

(Association Method of Second Embodiment)

Figure 6:
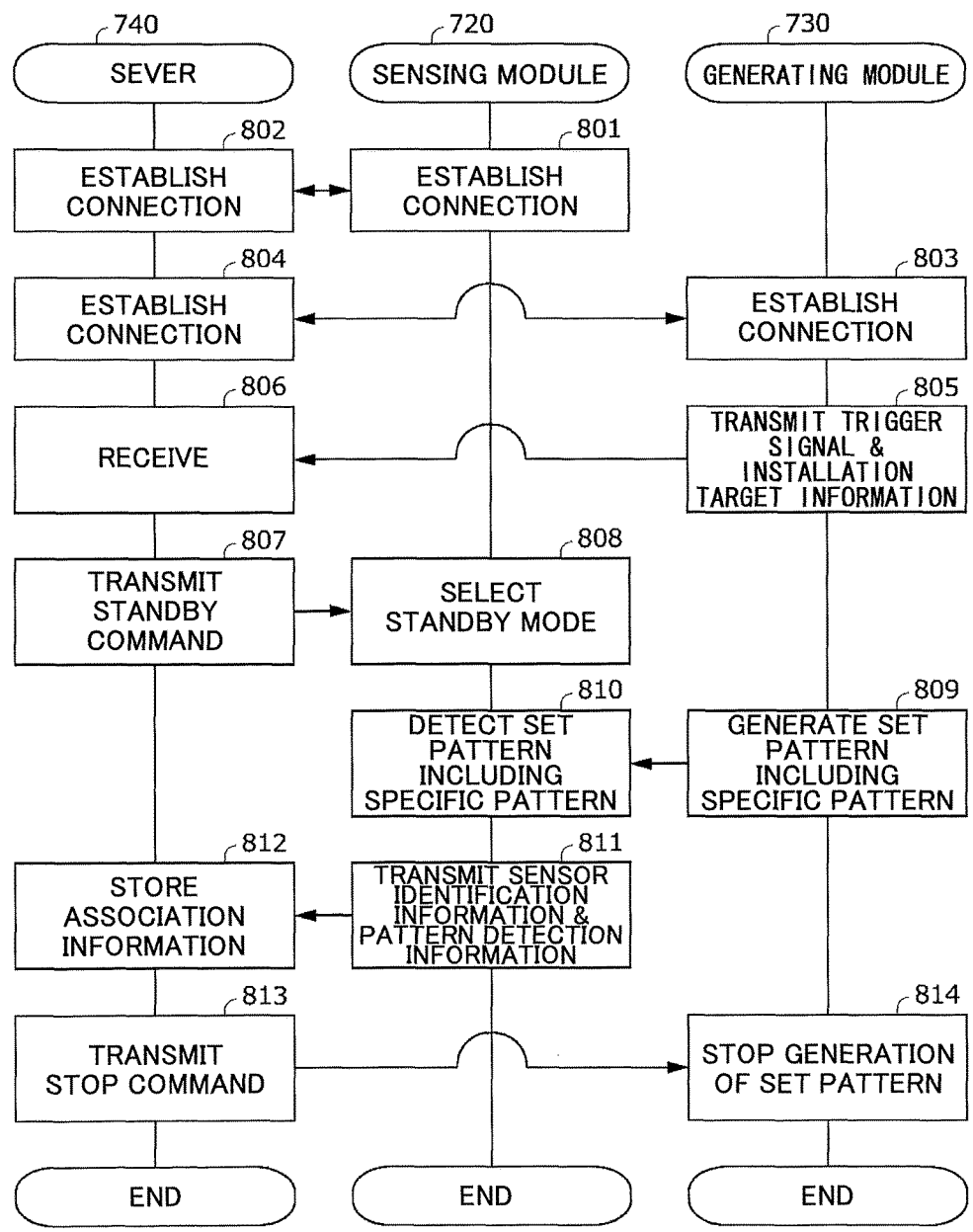
FIG. 6 is a flowchart showing operations of the network system according to the second embodiment when a specific pattern is detected.

In the following, an association method for associating a sensor 210 with the installation target of the sensor 210 according to the present embodiment will be described with reference to FIG. 6. FIG. 6 is a flowchart showing operations to be implemented in a case where a specific pattern is detected by the sensing module 720 within a predetermined waiting period. Note that operations of steps 801 to 804 of FIG. 6 are substantially identical to those of steps 601 to 604 of FIGS. 3 and 4 according to the first embodiment.

After connection is established between the generating module 730 and the server 740, in step 805, the trigger signal transmitting unit 361 of the generating module 730 transmits a trigger signal to the server 400 via the generating-side communication device 320 in response to an operation of the operation unit 340. Further, the installation target information transmitting unit 733 transmits installation target information 351 to the server 400 via the generating-side communication device 320. For example, the installation target information transmitting unit 733 may transmit installation target information 351 corresponding to the room selected by the operation unit 340 from among the rooms shown in the screen displayed on the display unit 330 in FIG. 2.

Then, in step 806, the standby command transmitting unit 431 of the server 740 receives the trigger signal from the generating module 730. Further, the storage control unit 742 of the server 740 receives the installation target information 351 from the generating module 730.

In step 807, the standby command transmitting unit 431 that has received the trigger signal transmits a standby command to at least one sensing module 720. As in the first embodiment, the standby command transmitting unit 431 transmits a standby command to a sensing module 720 for which association information 421 is not yet stored. Note that in some embodiments, the standby command may be transmitted to all of the sensing modules 720.

After connection is established between the sensing module 720 and the server 740, the selecting unit 242 of the sensing module 720 that has received the standby command selects the standby mode in step 808. The sensor control unit 243 enables detection of a set pattern by the sensor 210 in response to the selecting unit 242 selecting the standby mode. For example, assuming the first sensor 210a is configured to detect the intensity of light once per hour in the non-standby mode, and the set pattern corresponds to a light intensity variation per second, the sensor control unit 243 controls the first sensor 210a to be capable of detecting the light intensity variation per second in the standby mode.

After the trigger signal transmitting unit 361 of the generating module 730 transmits a trigger signal, the signal control unit 732 controls the signal generator 310 to generate a signal by varying a physical quantity of light or the like in step 809. For example, the set pattern may be a variation in light intensity per second. Note that the set pattern according to the present embodiment includes a specific pattern but does not include installation target information 351.

In step 810, the sensor 210 of the sensing module 720 detects the set pattern including the specific pattern. For example, the first sensor 210a may detect the set pattern that is represented by a light intensity variation per second. In FIG. 6, the set pattern is detected by the sensor 210 before a predetermined waiting period elapses from the time the standby mode is selected by the selecting unit 242.

The pattern detection information transmitting unit 722 generates pattern detection information in response to the sensor 210 detecting the specific pattern. Note that in the present embodiment, the pattern detection information does not include installation target information 351. In step 811, the pattern detection information transmitting unit 722 transmits the pattern detection information and sensor identification information 231 identifying the sensor 210 that has detected the specific pattern to the server 740.

Then, in step 812, the server 740 receives the pattern detection information and the sensor identification information 231. Further, the storage control unit 742 of the server 740 stores association information 421 associating the sensor identification information 231 received from the sensing module 720 that has transmitted the pattern detection information with the installation target information 351 transmitted from the generating module 730 that has generated the specific pattern. Note that the generating module 730 that has generated the specific pattern corresponds to the generating module 730 that has transmitted the trigger signal. Also, note that that the server 740 receives the installation target information 351 via the server-side communication device 410 in step 806 as described above.

In step 813, in response to the server 740 receiving the pattern detection information, the stop command transmitting unit 433 of the server 740 transmits a stop command to the generating module 730 that has transmitted the trigger signal.

In step 814, in response to receiving the stop command from the server 740, the signal control unit 732 controls the signal generator 310 to stop generating the signal including the set pattern. The sensing module 720 that has detected the specific pattern may automatically revert to the non-standby mode or may revert to the non-standby mode in response to an instruction from the server 740.

Note that the association method that is implemented in the present embodiment in the case where a specific pattern is not detected by the sensing module 720 within a predetermined waiting period may be substantially identical to the association method including steps 620 to 623 according to the first embodiment as shown in FIG. 4.

According to an aspect of the present embodiment, the generating module 730 transmits installation target information 351 directly to the server 740, and in this way, the installation target information 351 can be reliably communicated to the server 740.

(Third Embodiment)

A sensor network system according to a third embodiment of the present invention implements an input method for inputting installation target information 351 that differs from the sensor network system 100 according to the first embodiment as shown in FIG. 1 and the sensor network system 700 according to the second embodiment as shown in FIG. 5.

Figure 7:
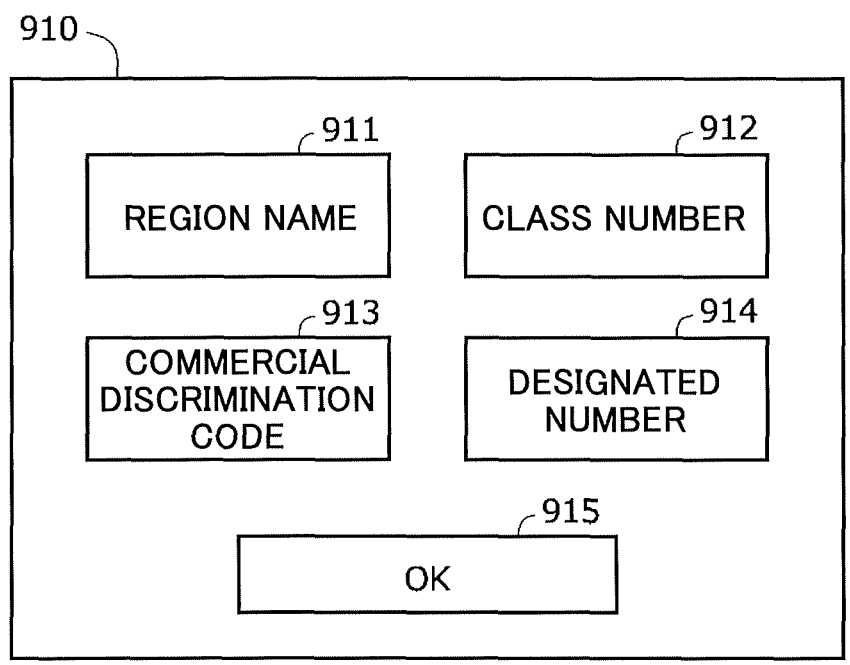
FIG. 7 is a diagram showing an example screen displayed for implementing a first input method according to a third embodiment of the present invention.

In a first input method according to the present embodiment, the signal control unit 362 (FIG. 1 or FIG. 5) controls the display unit 330 (FIG. 1 or FIG. 5) to display a screen 910 as shown in FIG. 7. The screen 910 displays a first input field 911, a second input field 912, a third input field 913, and a fourth input field 914 for inputting a vehicle registration number. Specifically, a region name is input to the first input field 911, a class number is input to the second input field 912, a commercial discrimination code is input to the third input field 913, and a designated number is input to the fourth input field 914. The operation unit 340 (FIG. 1 or FIG. 5) may accept characters as inputs to the first input field 911 through the fourth input field 914 by touch panel keyboard input, pull-down selection input, or some other input method. When the signal control unit 362 (FIG. 1 or FIG. 5) detects that an OK button 915 has been pressed via the operation unit 340 (FIG. 1 or FIG. 5), the signal control unit 362 determines that a character string combining the characters input to the first input field 911 through the fourth input field 914 corresponds to the installation target information 351.

The first input method according to the present embodiment may be implemented in a case where the sensing module 200 (FIG. 1) or the sensing module 720 (FIG. 5) is installed in a vehicle, for example.

Figure 8:
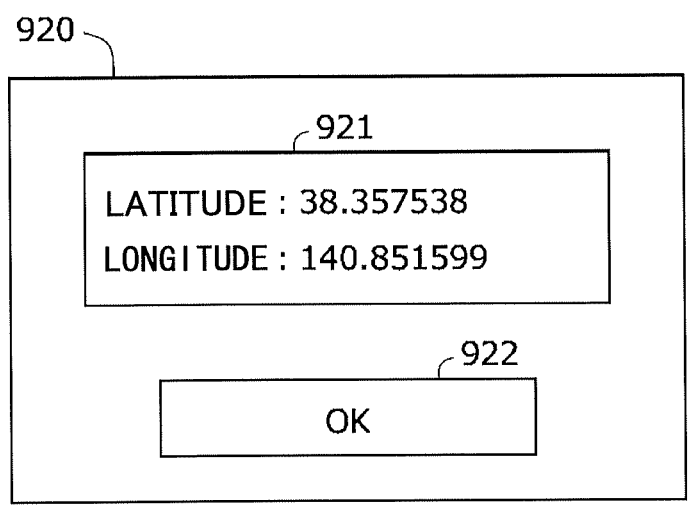
FIG. 8 is a diagram showing an example screen displayed for implementing a second input method according to the third embodiment.

In a second input method according to the present embodiment, the signal control unit 362 (FIG. 1 or FIG. 5) controls the display unit 330 (FIG. 1 or FIG. 5) to display a screen 920 as shown in FIG. 8. The screen 920 includes an input field 921 that indicates a longitude and a latitude. Note that content displayed in the input field 921 may be automatically input by a GPS (global positioning system) function, manually input via the operation unit 340 (FIG. 1 or FIG. 5), or input by some other method. The operation unit 340 (FIG. 1 or FIG. 5) may accept characters as inputs to the input field 921 by touch panel keyboard input, pull-down selection input, or some other input method. When the signal control unit 362 (FIG. 1 or FIG. 5) detects that an OK button 922 has been pressed via the operation unit 340 (FIG. 1 or FIG. 5), the signal control unit 362 determines that a character string combining the characters input to the input field 921 corresponds to the target information 351.

The second input method according to the present embodiment may be implemented in a case where the sensing module 200 (FIG. 1) or the sensing module 720 (FIG. 5) is installed in a field, for example.

Fourth Embodiment

Figure 9:
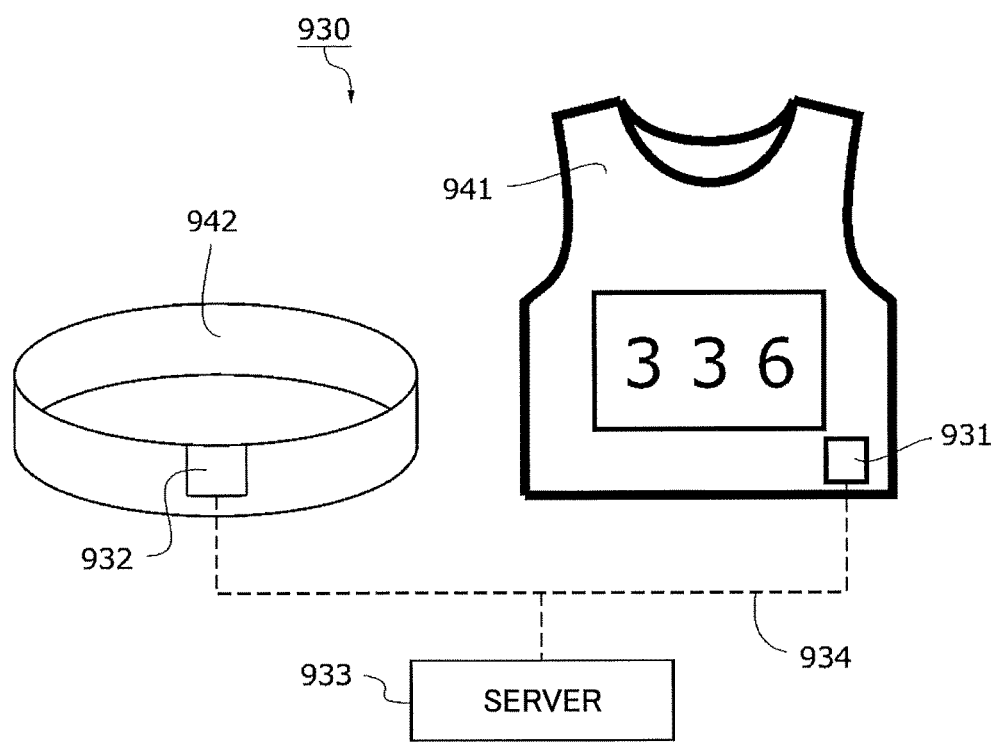
FIG. 9 is a configuration diagram of a sensor network system according to a fourth embodiment of the present invention.

A sensor network system 930 according to a fourth embodiment as shown in FIG. 9 includes a generating module 931, a sensing module 932, and a server 933. The generating module 931, the sensing module 932, and the server 933 are configured to communication with each other via a communication network 934 that is substantially identical to the communication network 500 according to the first embodiment.

The generating module 931 is attached to a bib 941 that is worn by a person that engages in sports. The generating module 931 may have a configuration substantially identical to that of the generating module 300 according to the first embodiment (FIG. 1) or the generating module 730 (FIG. 5) according to the second embodiment. However, the generating module 931 according to the present embodiment is not a smartphone but is instead a lightweight device that stores a number that uniquely identifies each specific bib 941 from among a plurality of bibs 941 as installation target information 351.

The sensing module 932 is attached to a wristband 942 to be worn on the wrist when a person engages in sports. The sensing module 932 may have a configuration substantially identical to that of the sensing module 200 according to the first embodiment (FIG. 1) or the sensing module 720 according to the second embodiment (FIG. 5). However, the sensing module 932 according to the present embodiment includes sensors 210 for measuring a physical quantity associated with biological information, such as body temperature, the physical quantity of light, and other physical quantities. The sensing module 932 stores sensor identification information 231 uniquely identifying each wristbands 942 from among a plurality of wristbands 942.

The server 933 is managed by an administrator of a sports event. The server 933 may have a configuration substantially identical to that of the server 400 according to the first embodiment (FIG. 1) or the server 740 according to the second embodiment (FIG. 5). The association method according to the first embodiment or the second embodiment may be executed in the sensor network system 930 according to the present embodiment so that association information associating installation target information 351 identifying a bib 941 with sensor identification information 231 identifying a wristband 942 may be stored in the server 933.

Conventionally, a wristband is associated with a corresponding bib by a person viewing a bib number written on the wristband. Because altering the association between a wristband and a bib has been difficult, when the bibs are washed, for example, finding the wristband associated with a bib has been burdensome. According to the present embodiment, association information may be set up through simple procedures as compared with the case where a wristband and a bib are manually associated with each other. Also, because the sensing module 932 for measuring biological information that is installed in the wristband 942 is used for associating the wristband 942 with the corresponding bib 941, the association information may be set up using a simple configuration as compared with a case where a dedicated sensing module is separately provided. Even if a wristband 942 previously associated with a bib 941 cannot be found after washing the bib 941, for example, an association between a wristband 942 and a bib 941 may be newly set up through simple operations. Also, in a case where a plurality of types of wristbands 942 provided with sensors 210 for different applications are prepared, altering the association between a bib 941 and a wristband 942 may be easier as compared with a case where the association is altered by a person.

Although the present invention has been described above with respect to certain illustrative embodiments, the present invention is not limited to the above embodiments. It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

In the following, further embodiments and aspects of the present invention are described.

According to one embodiment of the present invention, a sensor network system is provided that includes a server, one or more sensing modules including one or more sensors configured to detect a physical quantity, and at least one generating module. The generating module includes a signal generator configured to generate a signal by varying the physical quantity to be detected by a sensor of the one or more sensors included in a sensing module of the one or more sensing modules. The generating module is further configured to communicate installation target information identifying an installation target of the sensor to the server. The generating module further includes a signal control unit configured to control the signal generator to generate the signal that includes a set pattern including a specific pattern. The sensing module further includes a sensing-side communication device configured to communicate with the server, and a pattern detection information transmitting unit configured to transmit to the server, via the sensing-side communication device, pattern detection information generated in response to the sensor detecting the specific pattern and sensor identification information identifying the sensor that has detected the specific pattern. The server further includes a server-side communication device configured to communicate with the sensing-side communication device, and a storage control unit configured to store association information associating the sensor identification information received by the server-side communication device from the sensing module that has transmitted the pattern detection information with the installation target information transmitted from the generating module that has generated the specific pattern.

According to an aspect of the above embodiment, sensor identification information identifying a sensor and installation target information identifying the installation target of the sensor are stored in association with each other in the server, and in this way, a sensor and the installation target of the sensor may be accurately associated with each other. Further, a sensor and the installation target of the sensor can be associated with each other using a physical quantity detection function of the sensor, and in this way, the configuration of the sensing module can be simplified as compared with a case where a function for associating a sensor with its installation target has to be added. Also, a sensor and the installation target of the sensor can be associated with each other through relatively simple operations of generating and detecting a specific pattern, and in this way, human labor may be reduced and human operation errors due to erroneous association may be reduced as compared with a case where a human has to manually input the sensor identification information and the installation target information.

In one example embodiment of the sensor network system according to the present invention, the signal control unit controls the signal generator to generate the set pattern that further includes the installation target information, the pattern detection information transmitting unit generates the pattern detection information that includes the installation target information included in the set pattern, and the storage control unit acquires the installation target information from the pattern detection information.

According to an aspect of the above embodiment, installation target information is included in the set pattern, and the sensing module that has detected the set pattern communicates both the installation target information and the sensor identification information to the server. In this way, association of a sensor with its installation target may be more reliably performed with a simple configuration as compared with a case where the installation target information and the sensor identification information are separately communicated to the server.

In one example embodiment of the sensor network system according to the present invention, the generating module further includes a generating-side communication device configured to communicate with the server, and an installation target information transmitting unit configured to transmit the installation target information to the server via the generating-side communication device.

According to an aspect of the above embodiment, the generating module communicates the installation target information directly to the server, and in this way, the installation target information may be reliably communicated.

In one example embodiment of the sensor network system according to the present invention, the sensing module further includes a selecting unit configured to select at least one operation mode from among a plurality of operation modes including a standby mode and a non-standby mode, the storage control unit stores the association information when the standby mode is selected by the selecting unit, and the storage control unit does not store the association information when the non-standby mode is selected by the selecting unit.

According to an aspect of the above embodiment, a selection can be made between the standby mode in which association information is stored and the non-standby mode in which association information is not stored. In this way, when the standby mode is selected, the sensing module can execute operations suitable for communicating sensor identification information and installation target information, whereas when the non-standby mode is selected, the sensing module can execute operations suitable for implementing its primary detection function and other operations according to the situation without regard to whether the operations are suitable for communicating sensor identification information and installation target information.

In one example embodiment of the sensor network system according to the present invention, the sensing module further includes a sensor control unit, and the sensor control unit enables detection of the set pattern by the sensor in response to the standby mode being selected by the selecting unit.

According to an aspect of the above embodiment, the sensing module enables detection of a set pattern by the sensor when the standby mode is selected. In this way, even if the sensor is not capable of detecting a set pattern when the non-standby mode is selected, the sensor can still reliable detect a set pattern at least when the standby mode is selected.

In one example embodiment of the sensor network system according to the present invention, the sensor control unit disables detection of the set pattern by the sensor in response to the non-standby mode being selected by the selecting unit.

According to an aspect of the above embodiment, the sensing module disables detection of a set pattern by the sensor when the non-standby mode is selected. In this way, pattern detection can be prevented when association information does not have to be stored. Even if the sensor may have to perform special operations when the standby mode is selected, the sensor can perform other operations without being influenced by such special operations when the non-standby mode is selected.

In one example embodiment of the sensor network system according to the present invention, the pattern detection information transmitting unit transmits both the sensor identification information and the pattern detection information to the server via the sensing-side communication device when the standby mode is selected by the selecting unit, and the pattern detection information transmitting unit does not transmit at least one of the sensor identification information and the pattern detection information to the server via the sensing-side communication device when the non-standby mode is selected by the selecting unit.

According to an aspect of the above embodiment, in the standby mode that involves storing association information, pattern detection information can be reliably communicated from the sensing module to the server, and in the non-standby mode that does not require storing association information, unnecessary communication between the sensing module and the server may be prevented.

In one example embodiment of the sensor network system according to the present invention, the storage control unit stores the association information in response to receiving the pattern detection information from the sensing module that has the standby mode selected, and the storage control unit does not store the association information in response to receiving the pattern detection information from the sensing module that has the non-standby mode selected.

According to an aspect of the above embodiment, the storage control unit of the server determines whether association information is to be stored. In this way, the sensing module can perform the same operations in standby mode and non-standby mode such that the configuration of the sensing module can be simplified.

In one example embodiment of the sensor network system according to the present invention, the server further includes a standby command transmitting unit configured to transmit a standby command to at least one sensing module of the one or more sensing modules via the server-side communication device, and the selecting unit selects the standby mode in response to the sensing-side communication device receiving the standby command.

According to an aspect of the above embodiment, when association information needs to be stored, a standby command may be issued so that the standby mode can be reliably selected.

In one example embodiment of the sensor network system according to the present invention, the generating module further includes a trigger signal transmitting unit configured to transmit a trigger signal via the generating-side communication device, the standby command transmitting unit transmits the standby command in response to the server-side communication device receiving the trigger signal, and the signal control unit controls the signal generator to generate the signal including the set pattern during a period including a time after the trigger signal is transmitted.

According to an aspect of the above embodiment, the sensing module selects the standby mode based on a trigger signal. In this way, the sensing module can easily detect a set pattern included in a signal that is generated by the generating module after transmitting the trigger signal.

In one example embodiment of the sensor network system according to the present invention, the selecting unit selects the non-standby mode after a predetermined waiting period elapses from a time the standby mode is selected.

According to an aspect of the above embodiment, a sensing module that is not receiving a set pattern can be prevented from operating in the standby mode for an unnecessarily long time so that operations in the non-standby mode may not be unnecessarily hindered.

In one example embodiment of the sensor network system according to the present invention, the sensing module further includes a non-detection information transmitting unit configured to transmit, via the sensing-side communication device, non-detection information indicating that the specific pattern has not been detected when the sensor does not detect the specific pattern during a predetermined period after the standby mode is selected.

According to an aspect of the above embodiment, the server may be explicitly notified of the sensing module that has not detected a specific pattern, and in this way, a sensor and the installation target of the sensor may be more accurately associated with each other. Also, according to an aspect of the above embodiment, the server may be prevented from having to wait for an unnecessarily long time to receive pattern detection information from the sensing module.

In one example embodiment of the sensor network system according to the present invention, the server further includes a stop command transmitting unit configured to transmit a stop command via the server-side communication device in response to receiving the pattern detection information, and the signal control unit controls the signal generator to stop generation of the signal including the set pattern in response to receiving the stop command via the generating-side communication device.

According to an aspect of the above embodiment, when the server receives pattern detection information, the server transmits a stop command. In this way, the generating module may be prevented from generating a set pattern for an unnecessarily long period.

In one example embodiment of the sensor network system according to the present invention, the physical quantity is an intensity of light.

According to an aspect of the above embodiment, even in an environment including a plurality of sensing modules, a set pattern represented by a variation in light intensity may be selectively transmitted to a specific sensing module from among the plurality of sensing modules.

According to another embodiment of the present invention, an association method is provided that is to be implemented by a sensor network system including one or more sensing modules including one or more sensors configured to detect a physical quantity, at least one generating module including a signal generator configured to generate a signal by varying the physical quantity to be detected by a sensing module of the one or more sensors included in a sensing module of the one or more sensing modules, the generating module being configured to communicate installation target information identifying an installation target of the sensor to a server, and the server that is capable of communicating with the sensing module and the generating module. The association method includes the generating module controlling the signal generator to generate the signal that includes a set pattern including a specific pattern; the sensing module transmitting to the server, pattern detection information generated in response to the sensor detecting the specific pattern and sensor identification information identifying the sensor that has detected the specific pattern; and the server storing association information associating the sensor identification information received from the sensing module that has transmitted the pattern detection information with the installation target information communicated from the generating module that has generated specific pattern.

According to another embodiment of the present invention, a sensing module is provided that is used in a sensor network system including a server configured to store association information associating sensor identification information identifying a sensor that has detected a specific pattern represented by a variation in a physical quantity with installation target information identifying an installation target of the sensor, the installation target information being communicated from a generating module that has generated a signal including a set pattern that includes the specific pattern. The sensing module includes the sensor that is configured to detect the physical quantity; a sensing-side communication device configured to communicate with the server; and a pattern detection information transmitting unit configured to transmit to the server, via the sensing-side communication device, the pattern detection information generated in response to the sensor detecting the specific pattern and the sensor identification information identifying the sensor that has detected the specific pattern.

According to another embodiment of the present invention, a server is provided that is used in a sensor network system including one or more sensing modules including one or more sensors configured to detect a physical quantity and at least one generating module configured to generate a signal that includes a set pattern including a specific pattern by varying the physical quantity to be detected by a sensor of the one or more sensors included in a sensing module of the one or more sensing modules, the generating module further being configured to communicate installation target information identifying an installation target of the sensor. The server includes a server-side communication device configured to receive from the sensing module, pattern detection information generated in response to the sensor detecting the specific pattern and sensor identification information identifying the sensor that has detected the specific pattern; and a storage control unit configured to store association information associating the sensor identification information received by the server-side communication device from the sensing module that has transmitted the pattern detection information with the installation target information communicated from the generating module that has generated the specific pattern.

What is claimed is:

1. A sensor network system comprising:
   a server;
   one or more sensing modules including one or more sensors configured to detect a physical quantity; and
   at least one generating module that is provided separately from the one or more sensing modules and includes a signal generator configured to generate a signal by varying the physical quantity and cause a sensor of the one or more sensors included in a sensing module of the one or more sensing modules to detect the generated signal, the generating module being configured to communicate installation target information identifying an installation target of the sensor to the server;
   wherein the generating module further includes a signal control unit configured to control the signal generator to generate the signal that includes a set pattern including a specific pattern;
   wherein the sensing module further includes
      a sensing-side communication device configured to communicate with the server, and
      a pattern detection information transmitting unit configured to transmit to the server, via the sensing-side communication device, pattern detection information generated in response to the detection, by the sensor, of the specific pattern included in the signal generated by the signal generator and sensor identification information identifying the sensor that has detected the specific pattern; and
   wherein the server further includes
      a server-side communication device configured to communicate with the sensing-side communication device, and
      a storage control unit configured to store association information associating the sensor identification information received by the server-side communication device from the sensing module that has transmitted the pattern detection information with the installation target information transmitted from the generating module that has generated the signal including the specific pattern.

2. The sensor network system according to claim 1, wherein
   the signal control unit controls the signal generator to generate the set pattern that further includes the installation target information;
   the pattern detection information transmitting unit generates the pattern detection information that includes the installation target information included in the set pattern; and the storage control unit acquires the installation target information from the pattern detection information.

3. The sensor network system according to claim 1, wherein the generating module further includes
a generating-side communication device configured to communicate with the server; and
an installation target information transmitting unit configured to transmit the installation target information to the server via the generating-side communication device.

4. The sensor network system according to claim 1, wherein
the sensing module further includes a selecting unit configured to select at least one operation mode from among a plurality of operation modes including a standby mode and a non-standby mode;
the storage control unit stores the association information when the standby mode is selected by the selecting unit; and
the storage control unit does not store the association information when the non-standby mode is selected by the selecting unit.

5. The sensor network system according to claim 4, wherein
the sensing module further includes a sensor control unit; and
the sensor control unit enables detection of the set pattern by the sensor in response to the standby mode being selected by the selecting unit.

6. The sensor network system according to claim 5, wherein
the sensor control unit disables detection of the set pattern by the sensor in response to the non-standby mode being selected by the selecting unit.

7. The sensor network system according to claim 4, wherein
the pattern detection information transmitting unit transmits both the sensor identification information and the pattern detection information to the server via the sensing-side communication device when the standby mode is selected by the selecting unit; and
the pattern detection information transmitting unit does not transmit at least one of the sensor identification information and the pattern detection information to the server via the sensing-side communication device when the non-standby mode is selected by the selecting unit.

8. The sensor network system according to claim 4, wherein
the storage control unit stores the association information in response to receiving the pattern detection information from the sensing module that has the standby mode selected; and
the storage control unit does not store the association information in response to receiving the pattern detection information from the sensing module that has the non-standby mode selected.

9. The sensor network system according to claim 4, wherein
the server further includes a standby command transmitting unit configured to transmit a standby command to at least one sensing module of the one or more sensing modules via the server-side communication device; and
the selecting unit selects the standby mode in response to the sensing-side communication device receiving the standby command.

10. The sensor network system according to claim 9, wherein
the generating module further includes a trigger signal transmitting unit configured to transmit a trigger signal via the generating-side communication device;
the standby command transmitting unit transmits the standby command in response to the server-side communication device receiving the trigger signal; and
the signal control unit controls the signal generator to generate the signal including the set pattern during a period including a time after the trigger signal is transmitted.

11. The sensor network system according to claim 4, wherein
the selecting unit selects the non-standby mode after a predetermined waiting period elapses from a time the standby mode is selected.

12. The sensor network system according to claim 4, wherein
the sensing module further includes a non-detection information transmitting unit configured to transmit, via the sensing-side communication device, non-detection information indicating that the specific pattern has not been detected when the sensor does not detect the specific pattern during a predetermined period after the standby mode is selected.

13. The sensor network system according to claim 1, wherein
the server further includes a stop command transmitting unit configured to transmit a stop command via the server-side communication device in response to receiving the pattern detection information; and
the signal control unit controls the signal generator to stop generation of the signal including the set pattern in response to receiving the stop command via the generating-side communication device.

14. The sensor network system according to claim 1, wherein the physical quantity is an intensity of light.

15. An association method to be implemented by a sensor network system that includes
a server,
one or more sensing modules including one or more sensors configured to detect a physical quantity, and
at least one generating module that is provided separately from the one or more sensing modules and includes a signal generator configured to generate a signal by varying the physical quantity and cause a sensor of the one or more sensors included in a sensing module of the one or more sensing modules to detect the generated signal, the generating module being configured to communicate installation target information identifying an installation target of the sensor to the server, and the server being capable of communicating with the sensing module and the generating module, the association method comprising:
the generating module controlling the signal generator to generate the signal that includes a set pattern including a specific pattern;
the sensing module transmitting to the server, pattern detection information generated in response to the detection, by the sensor, of the specific pattern included in the signal generated by the signal generator and sensor identification information identifying the sensor that has detected the specific pattern; and
the server storing association information associating the sensor identification information received from the sensing module that has transmitted the pattern detection information with the installation target information communicated from the generating module that has generated the signal including the specific pattern.

16. A sensing module that is used in a sensor network system,
the sensor network system including
the sensing module,
a server, and
a generating module that is provided separately from the sensing module and includes a signal generator configured to generate a signal including a set pattern that includes a specific pattern by varying a physical quantity and to cause a sensor of the sensing module to detect the generated signal, the generating module further being configured to communicate installation target information identifying an installation target of the sensor to the server,
the sensing module comprising:
the sensor that is configured to detect the physical quantity;
a sensing-side communication device configured to communicate with the server; and
a pattern detection information transmitting unit configured to transmit to the server, via the sensing-side communication device, pattern detection information generated in response to the detection, by the sensor, of the specific pattern included in the signal generated by the signal generator and sensor identification information identifying the sensor that has detected the specific pattern, the server being configured to store association information associating the sensor identification information with the installation target information.

17. A server that is used in a sensor network system including
the server,
one or more sensing modules including one or more sensors configured to detect a physical quantity, and
at least one generating module that is provided separately from the one or more sensing modules and includes a signal generator configured to generate a signal that includes a set pattern including a specific pattern by varying the physical quantity and to cause a sensor of the one or more sensors included in a sensing module of the one or more sensing modules to detect the generated signal, the generating module further being configured to communicate installation target information identifying an installation target of the sensor to the server, the server comprising:
a server-side communication device configured to receive from the sensing module, pattern detection information generated in response to the detection, by the sensor, of the specific pattern included in the signal generated by the signal generator and sensor identification information identifying the sensor that has detected the specific pattern; and
a storage control unit configured to store association information associating the sensor identification information received by the server-side communication device from the sensing module that has transmitted the pattern detection information with the installation target information communicated from the generating module that has generated the signal including the specific pattern.

* * * * *